United States Patent
Secord et al.

(10) Patent No.: US 6,373,831 B1
(45) Date of Patent: Apr. 16, 2002

(54) SYSTEMS AND METHODS OF CHANNEL CODING AND INVERSE-MULTIPLEXING FOR MULTI-CARRIER CDMA SYSTEMS

(75) Inventors: Norman P. Secord, Ottawa; Mo-Han Fong; Geng Wu, both of Verdun; Leo Strawczynski, Ottawa, all of (CA); Ahmad Jalali, Plano, TX (US); Robert Matyas; Ning Guo, both of Nepean (CA); Wookwon Lee, Ottawa (CA); Amir Bigloo, Vancouver (CA)

(73) Assignee: Nortel Networks Ltd., St. Laurent (CA)

( * ) Notice: Subject to any disclaimer, the term of this patent is extended or adjusted under 35 U.S.C. 154(b) by 0 days.

(21) Appl. No.: 09/047,604

(22) Filed: Mar. 25, 1998

Related U.S. Application Data (60) Provisional application No. 60/041,377, filed on Mar. 26, 1997, and provisional application No. 60/042,362, filed on Mar. 26, 1997.

(51) Int. Cl.[7] ............................................... H04B 7/216
(52) U.S. Cl. ....................... 370/342; 370/335; 370/441; 375/225; 455/522
(58) Field of Search ................................. 370/328, 329, 370/335, 342, 479, 441; 375/130, 225; 455/422, 450, 436, 13.4, 522

(56) References Cited

U.S. PATENT DOCUMENTS

| | | | |
|---|---|---|---|
| 4,881,241 A | * 11/1989 | Pommier et al. | ............ 375/230 |
| 5,418,813 A | * 5/1995 | Chaffner et al. | ............ 370/342 |
| 5,442,625 A | * 8/1995 | Gitlin et al. | ................ 370/342 |
| 5,497,395 A | * 3/1996 | Jou | ............................. 370/209 |
| 5,559,750 A | 9/1996 | Yano et al. | |
| 5,603,096 A | * 2/1997 | Gilhousen et al. | ............ 455/69 |
| 5,625,871 A | 4/1997 | Myer et al. | |
| 5,793,744 A | * 8/1998 | Kanerva et al. | ............ 370/209 |
| 5,812,938 A | * 9/1998 | Gilhousen et al. | ............ 455/69 |
| 5,856,971 A | * 1/1999 | Gitlin et al. | ................ 370/335 |
| 5,956,332 A | * 9/1999 | Rasanen et al. | ............ 370/342 |
| 5,991,627 A | * 11/1999 | Honkasalo et al. | ......... 455/437 |
| 6,072,787 A | * 6/2000 | Hamalainen et al. | ....... 370/335 |

OTHER PUBLICATIONS

Yee, Nathan, Linnartz, Jean–Paul and Fettweis, Gerhard, "Multi–Carrier CDMA in Indoor Wireless Radio Networks", D1.3.1–D1.3.5.

Cimini, Leonard Jr., "Analysis and Simulation of a Digital Mobile Channel Using Orthogonal Frequency Division Multiplexing," Jul. 1985, IEEE Transactions on Communications, vol. Com 33, No. 7665–675.

\* cited by examiner

*Primary Examiner*—David R. Vincent
*Assistant Examiner*—Bob A. Phunkulh
(74) *Attorney, Agent, or Firm*—Bruce Garlick (57) ABSTRACT

Methods and apparatus for transmitting data over a multichannel CDMA system are disclosed in accordance with the teachings of the present invention wherein the system includes an encoder for encoding a data stream with error correction, an interleaver for interleaving the data stream, a multiplexor for multiplexing a plurality of power control symbols onto the data stream, and an inverse-multiplexor for inverse-multiplexing the data stream onto multiple different communication channels. The system may also include additional error correction encoding and interleaving steps.

19 Claims, 7 Drawing Sheets

SYSTEMS AND METHODS OF CHANNEL CODING AND INVERSE-MULTIPLEXING FOR MULTI-CARRIER CDMA SYSTEMS

CROSS-REFERENCE TO RELATED APPLICATION

This application is a Continuation of applicants' copending provisional applications Ser. Nos. 60/041,377 and 60/042,362 both of which were filed on Mar. 26, 1997 and both of which are hereby incorporated by reference into the present application.

FIELD OF THE INVENTION

The invention relates generally to the field of multi-carrier CDMA systems and more particularly, to systems and methods of channel coding and inverse-multiplexing in a multi-channel CDMA system to obtain higher data rates using lower rate channels.

BACKGROUND OF THE INVENTION

In multi-carrier CDMA systems, as discussed in TR45.5 and CDMA Development Group (CDG) one option for third generation CDMA systems is for user data to be simultaneously carried on multiple carriers. In the third generation of Personal Communication Systems (PCS), an information data rate of as much as 2 Mbps for indoor, and fixed wireless systems, as required by ITU, is to be supported over a system bandwidth of 5 MHz and above. The current CDMA systems defined in the IS-95 standard of the Telecommunications Industry Association and the Electronic Industries Association (TIA/EIA/IS-95), supports a maximum information rate of 14.4 kbps on a 1.25 MHZ bandwidth.

Currently, there are two basic approaches being considered for utilizing the wider bandwidth in a third generation CDMA system. First, is the Direct Spread approach where signals are spread onto the entire bandwidth using one carrier. This approach suffers from the problem of not being compatible with the present CDMA systems (i.e. it is not backwards compatible). The second approach is a multi-carrier approach.

Dividing the bandwidth into N sub-bands and simultaneously spreading identical symbols onto each of the sub-bands has been proposed by Lucent Technologies, for example. While this approach overcomes the problem associated with the first approach (Direct Spread which is not backwards compatible) it suffers from the problem of underutilizing the data rate capability of the system.

Accordingly there exists a need for a system and method of utilizing the wider multi-carrier bandwidth that is backwards compatible and efficiently utilizes the enhanced data rate capabilities of the wider bandwidth.

A need also exists for such a system which accurately communicates information from the transmitter to the receiver.

Further, a need exists for a system which uses multiple slower data streams to carry the same amount of data as a single faster data stream.

A need also exists for a CDMA system that can coexist in the same frequency spectrum, or overlay, existing CDMA carriers so that available bandwidth and channel capacity can be dynamically shared between existing systems and new systems.

Accordingly it is an object of the present invention to provide systems and methods of communicating over a wider bandwidth in a manner which is compatible with present CDMA systems.

It is another object of the present invention to provide such a system and method which efficiently utilizes the communication capabilities of a wider bandwidth.

It is a further object of the present invention to provide such systems and methods which accurately communicate information from a transmitter to a receiver.

It is yet another object of the present invention to provide systems and methods of communicating information from a transmitter to a receiver which may utilize multiple slower data streams yet still provide the same aggregate rate of transmission as a single faster data stream.

Another object of the present invention is to provide a CDMA system that can coexist in the same frequency spectrum, or overlay, existing CDMA carriers so that available bandwidth and channel capacity can be dynamically shared between existing systems and new systems.

These and other objects of the invention will become apparent to those skilled in the art from the following description thereof.

SUMMARY OF THE INVENTION

In accordance with the teachings of the present invention, these and other objects may be accomplished by the present systems and methods of channel coding and inverse-multiplexing for multi-carrier CDMA systems. The present invention includes a data stream which may be encoded with error correction, interleaved, inverse-multiplexed onto a plurality of communication channels such that one portion of the data stream is spread onto a first communication channel and another portion of the data stream is spread onto a second communication channel.

In an exemplary embodiment of the invention, the system includes an error correction encoder configured to add error correction bits to a data stream. It also includes an interleaver and a inverse-multiplexor configured to spread the data stream over multiple communication channels. These components may be arranged in various configurations.

In another embodiment of the invention, the system includes encoding means for encoding a data stream with error correction bits, interleaver means for interleaving the data stream, multiplexing means for multiplexing at least one power control symbol onto the data stream, and inverse-multiplexor means for inverse-multiplexing the data stream onto a plurality of communication channels. These components may also be arranged in different configurations.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which.

DETAILED DESCRIPTION OF THE INVENTION

In a multi-carrier Code Division Multiple Access (CDMA) system, data is communicated over multiple carriers (channels) simultaneously. The terms carrier and channel will be used interchangeably throughout this disclosure. Thus the total available bandwidth of the system is the sum of the bandwidth supported by each individual carrier. The present invention attempts to take maximum advantage of this bandwidth by channel coding, multiplexing the power control subchannel onto the data channel and inverse-multiplexing communicated data over the different channels. An aspect of the present invention combines forward error correction with a multi-carrier CDMA transmission scheme to provide a high degree of transmission reliability and frequency diversity while maximizing use of the available bandwidth. By using a spreading scheme on each carrier that is compatible with the spreading scheme of the existing CDMA systems, the two systems can coexist without creating undue interference. One skilled in the art will recognize that the present invention does not have to be operated in overlay, it can also be operated in its own frequency spectrum as a stand alone system. Compared with the simulcast method of multi-carrier transmission proposed by Lucent Technologies, Inc., the present invention reduces the data rate on each carrier, thus increasing the maximum bit rate supported by the system and reducing the Walsh spreading code channel resource used per carrier by N times (where N is the number of carriers).

The present system may employ different configurations depending upon when the data is inverse-multiplexed onto the multiple carriers. Some of these different configurations will be discussed herein with regard to the Figures. Although only certain configurations are illustrated, it is understood that other configurations may be possible for channel coding, multiplexing the power control subchannel with the data channel and/or inverse-multiplexing the communicated data over multiple channels. These other configurations are also considered to be within the scope of the present invention.

Figure 1:
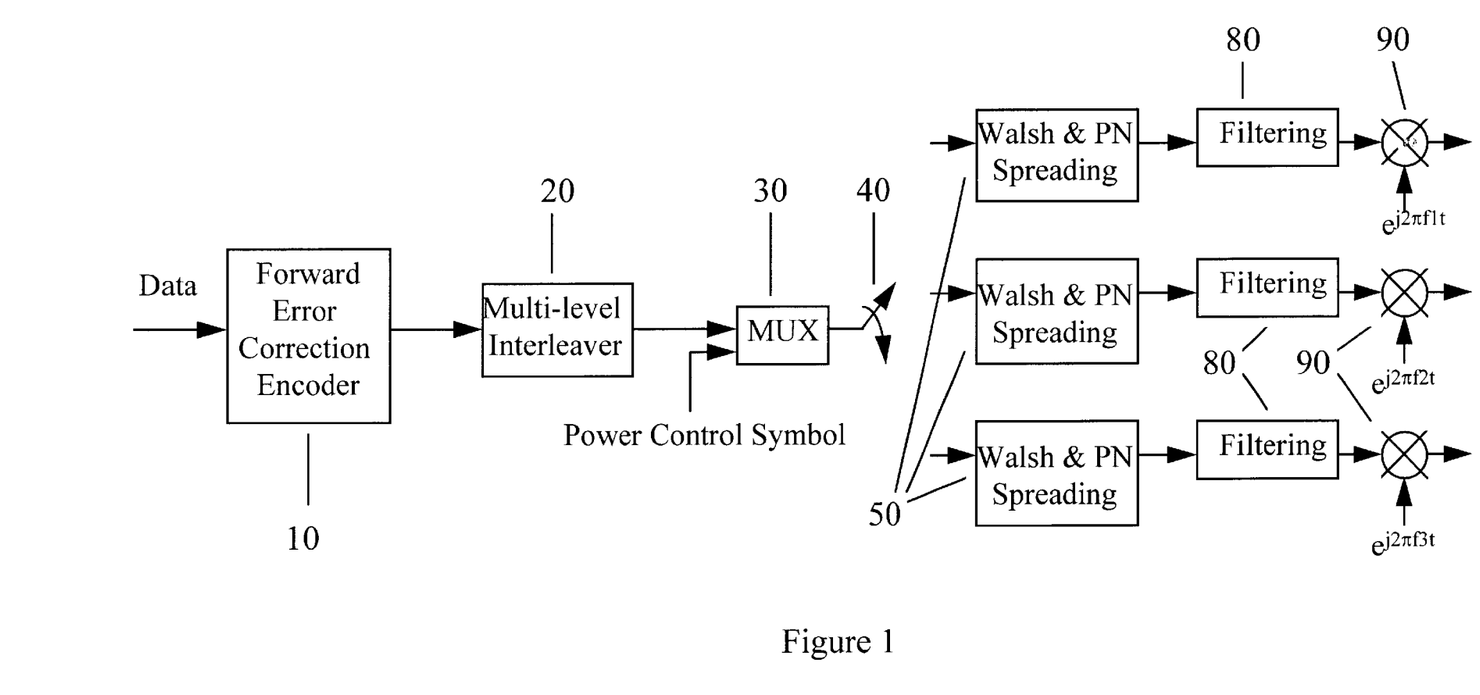
FIG. 1 depicts a block diagram of the preferred embodiment of a system and method of channel coding and inverse-multiplexing for multi-carrier CDMA systems in accordance with the invention.

FIG. 1 is an illustration of an embodiment of the invention including error correction encoder 10, interleaver 20, multiplexor 30, inverse-multiplexor 40, and Walsh and PN spreader 50, baseband pulse shaping filter 80 and frequency up-converter 90. Those skilled in the art will recognize that while FIG. 1 illustrates error correction encoder 10 as a forward error correction encoder any suitable error correction encoder (i.e. convolutional, block, turbo etc.) may be employed without departing from the scope of the invention. Further, while Walsh and PN spreader 50 is disclosed, it will be apparent to those in the art that other types of CDMA spreading codes can be employed (i.e. orthogonal or quasi-orthogonal codes with or without PN codes) and the spreading sequences can be real or complex. Similarly, although three carriers are illustrated, the invention is not so limited. Two or more carriers may be considered a multi-carrier system. In the embodiment disclosed in FIG. 1, the data stream is inverse-multiplexed by inverse-multiplexor 40 after the forward error correction encoding is performed by encoder 10 and after the interleaving is performed by interleaver 20. While FIG. 1 also illustrates that power control symbols are multiplexed onto the data stream prior to inverse-multiplexing, one skilled in the art will recognize that the system illustrated in this and other Figures herein could also operate without multiplexing the power control symbols and instead employing one or more, or a portion of one or more, of the multiple channels for the purpose of communicating the power control symbols. While the term multiplexed is employed herein, the power control chips may actually be punctured into the encoded data stream. Thus, every time the power control chips are referred to herein as being multiplexed, one skilled in the art will understand that it can also include puncturing. Further, while FIG. 1 illustrates interleaver 20 as a multi-level interleaver, the system could also operate with a standard interleaver 20. To obtain maximum frequency diversity, however, the interleaver 20 is preferably designed such that the encoded bits from a single information bit are spread or distributed on different carriers. A multi-level interleaver 20 makes use of the frequency diversity provided by different carriers. Each code symbol belonging to a particular code word may be placed into a separate memory block (i.e. different level). For example, if code word $A=(A_1, A_2, A_3, \ldots, A_M)$, then each code symbol $A_1, A_2, \ldots, A_M$ would be placed into a different memory block and at the output, the commutator would read out one code symbol from each memory block in a round robin fashion. Thus, when the data stream is inverse-multiplexed onto the N carriers, each subsequent code symbol belonging to a particular code word would be distributed to a different carrier. Each level of interleaving provides time diversity for one carrier whereas the combination of the different levels provides frequency diversity across the carriers after the error decoding at the receiver. This is one possible form of a multi-level interleaver 20. The invention may be implemented with most forms of interleavers 20, however if the interleaving operates as a function of the number of carriers more frequency diversity is obtained.

Figure 2:
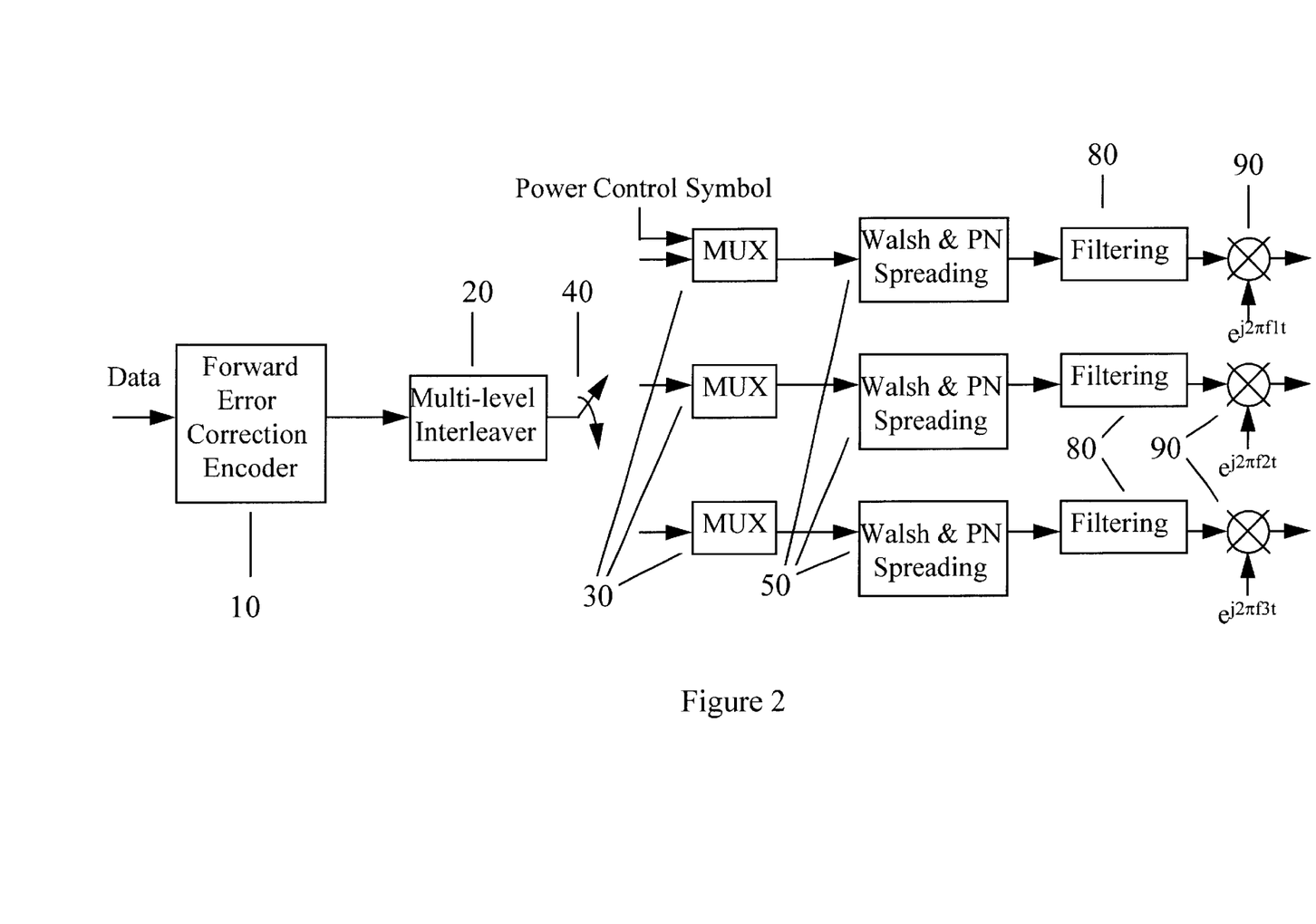
FIG. 2 depicts the invention of FIG. 1 illustrating the power control symbols being multiplexed onto a portion of the data stream after the data stream has been inverse-multiplexed onto multiple carriers.
Figure 3:
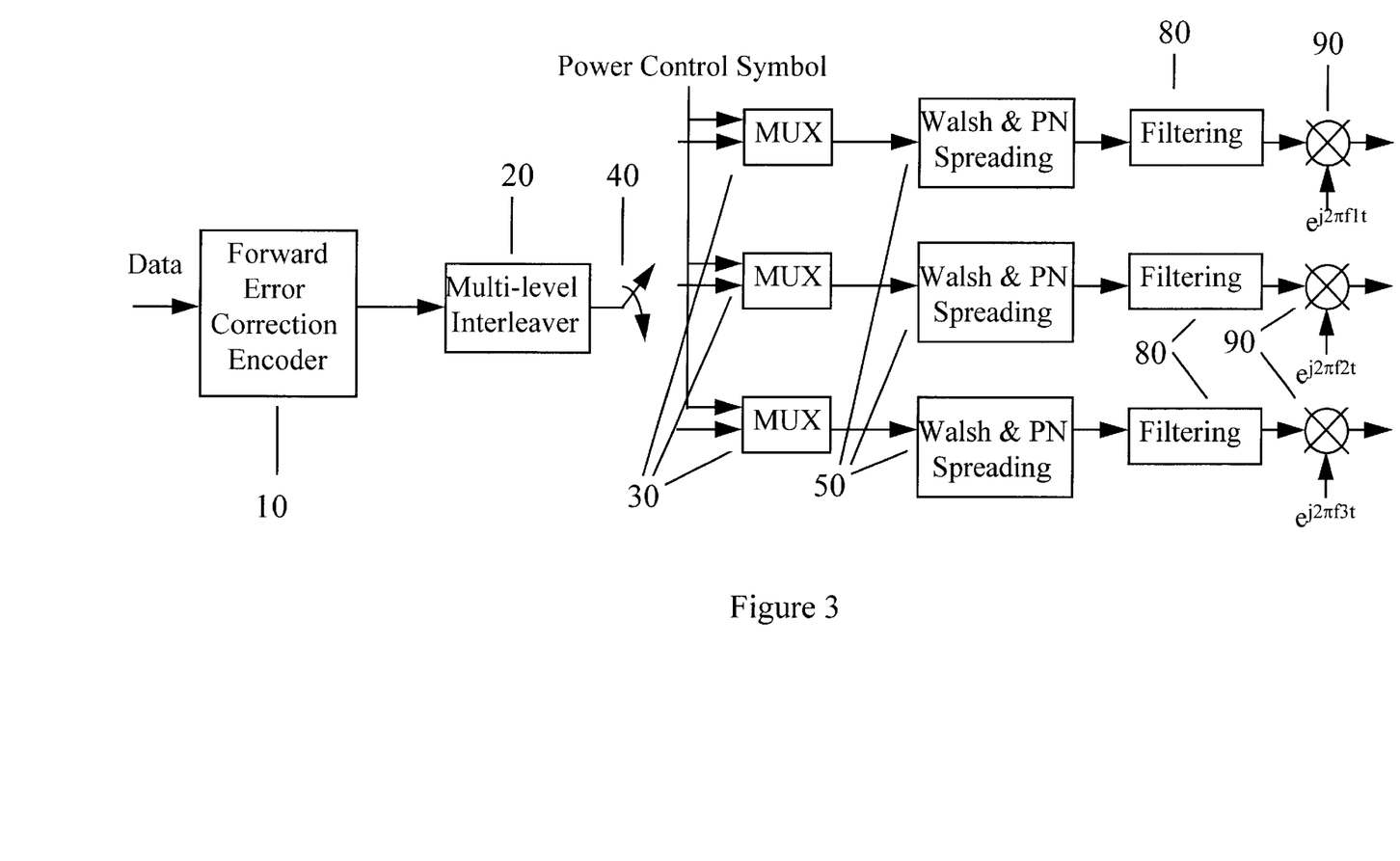
FIG. 3 depicts the invention of FIG. 1 illustrating the power control symbols being multiplexed onto each portion of the data stream after the data stream has been inverse-multiplexed onto multiple carriers.

FIGS. 2 and 3 also illustrate embodiments of the invention which include an error correction encoder 10, interleaver 20, multiplexor 30, inverse-multiplexor 40, Walsh & PN spreader 50, baseband pulse shaping filter 80 and frequency up-converter 90. In FIGS. 2 and 3, however, the inverse-multiplexing occurs before the power control symbols are multiplexed onto the data stream. In the embodiment disclosed in FIG. 2, the power control symbols are only multiplexed onto one of the carriers. Thus, there is no multi-carrier frequency diversity for the power control subchannel. In the embodiment disclosed in FIG. 3, the power control symbols are multiplexed onto all of the carriers. Those skilled in the art will recognize that while FIGS. 2 and 3 illustrate the configurations wherein the power control symbols used to control the reverse link power are multiplexed onto either one or all of the carriers, other configurations wherein the power control symbols may be multiplexed onto some but not all of the carriers are also intended to be within the scope of the invention.

Figure 4:
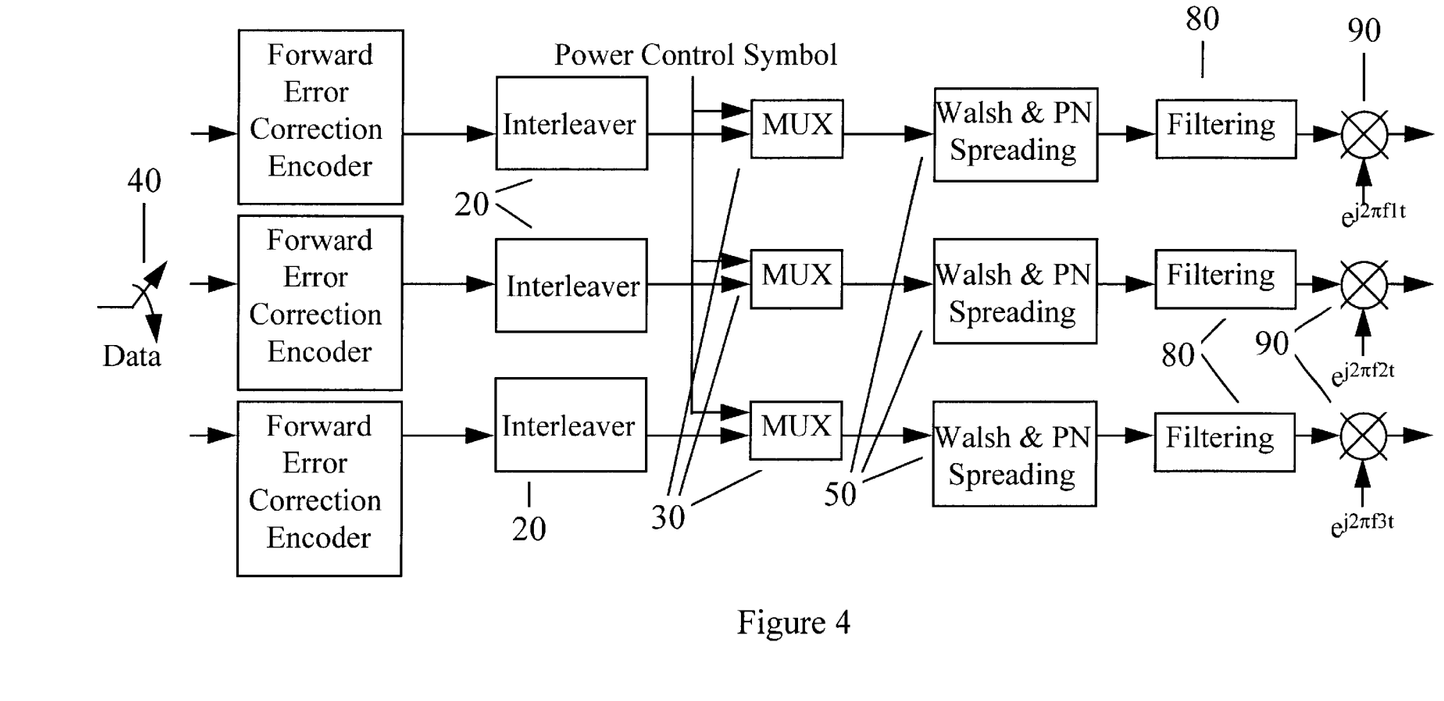
FIG. 4 depicts the invention of FIG. 1 illustrating the inverse-multiplexing being the first operation on the data stream.

FIG. 4 is an illustration of an embodiment of the invention also including error correction encoder 10, interleaver 20, multiplexor 30, inverse-multiplexor 40, Walsh & PN spreader 50, baseband pulse shaping filter 80 and frequency up-converter 90. In the embodiment illustrated in FIG. 4, the data stream is inverse-multiplexed onto the multiple carriers prior to any error correction encoding of the data stream, interleaving of the data stream or multiplexing of power control symbols onto the data stream. Those skilled in the art will recognize that the power control symbols may be multiplexed onto any number of the different carriers (i.e. from 1 to all) and still fall within the scope of the invention.

Figure 5:
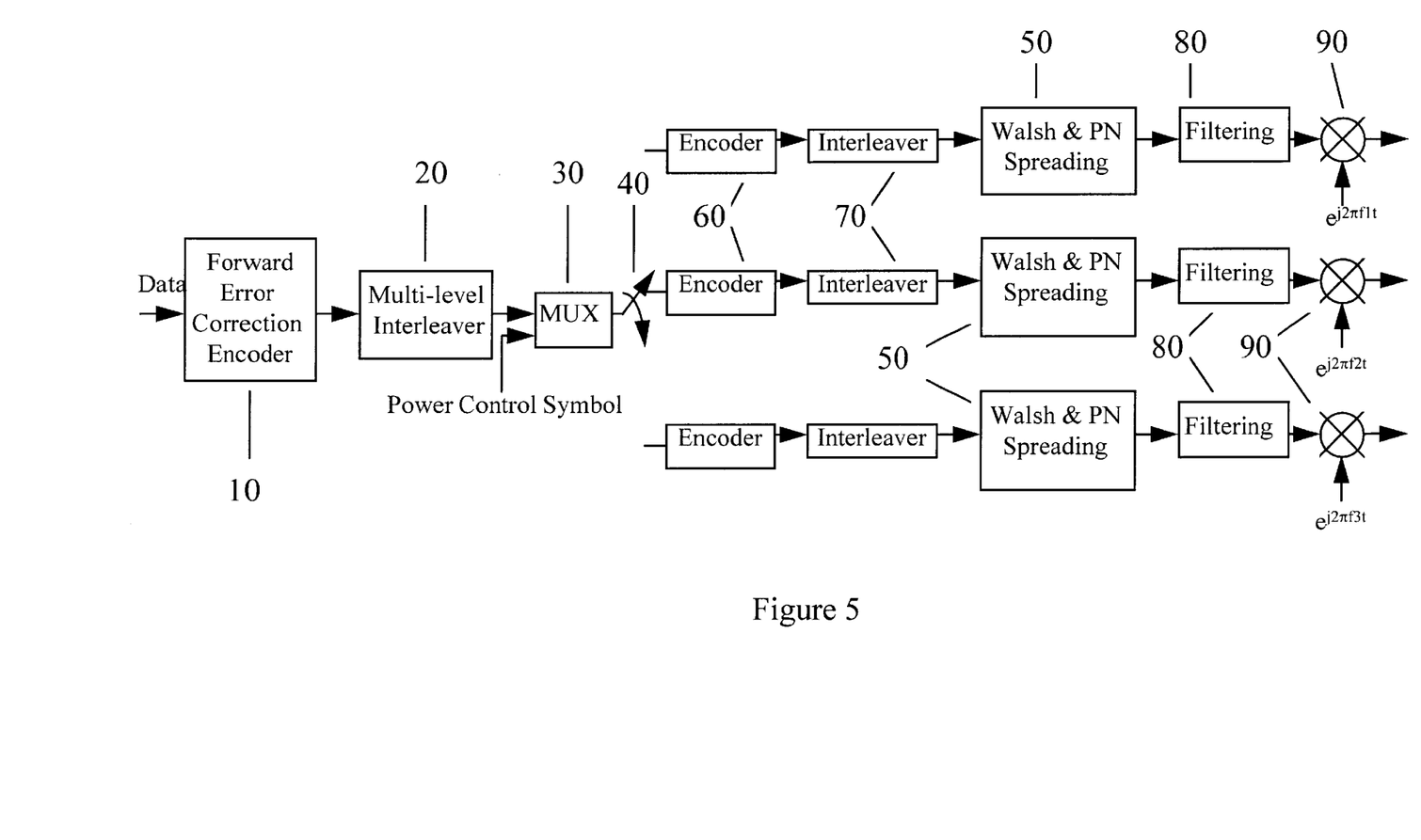
FIG. 5 depicts the invention of FIG. 1 with additional encoding and interleaving.

FIG. 5 is an illustration of an embodiment of the invention including error correction encoder 10, interleaver 20, multiplexor 30, inverse-multiplexor 40, Walsh spreader 50, baseband pulse shaping filter 80 and frequency up-converter 90 in the same configuration as in FIG. 1. The embodiment illustrated in FIG. 5 differs from the embodiment in FIG. 1 in that the embodiment of FIG. 5 includes additional encoders 60 and interleavers 70 associated with the different carriers. While in the Figure the system is illustrated with an additional encoder 60 and interleaver 70 associated with each carrier, it is considered within the scope of the present invention to have only one additional encoder 60 and interleaver 70 associated with only one of the carriers or to have additional encoders 60 and interleavers 70 respectively associated with more than one but less than all of the carriers.

In the embodiment of FIG. 5, the data stream is encoded with a forward error correction code and then inverse-multiplexed onto multiple carriers each with a second level of error correction encoding. An advantage of this method is that a better tradeoff can be made between performance and complexity than if a single level of error correction encoding was employed either before or after inverse-multiplexing. The data stream output from the first encoder 10 is interleaved before being input to the inverse-multiplexor 40. This is done to provide an additional time diversity on top of the frequency diversity provided by the inverse-multiplexing. A reason for providing the second level of interleaving after the inverse-multiplexing is to provide time diversity and randomize any error bursts for the error correction encoding on each individual carrier. The power control symbols may be multiplexed onto the data stream by puncturing out the encoded data bits. The power control symbols are then sent on any or all of the carriers with the user data. By "hopping" the power control symbols to different channels at different times, frequency diversity is achieved for the power control symbols as well.

Figure 6:
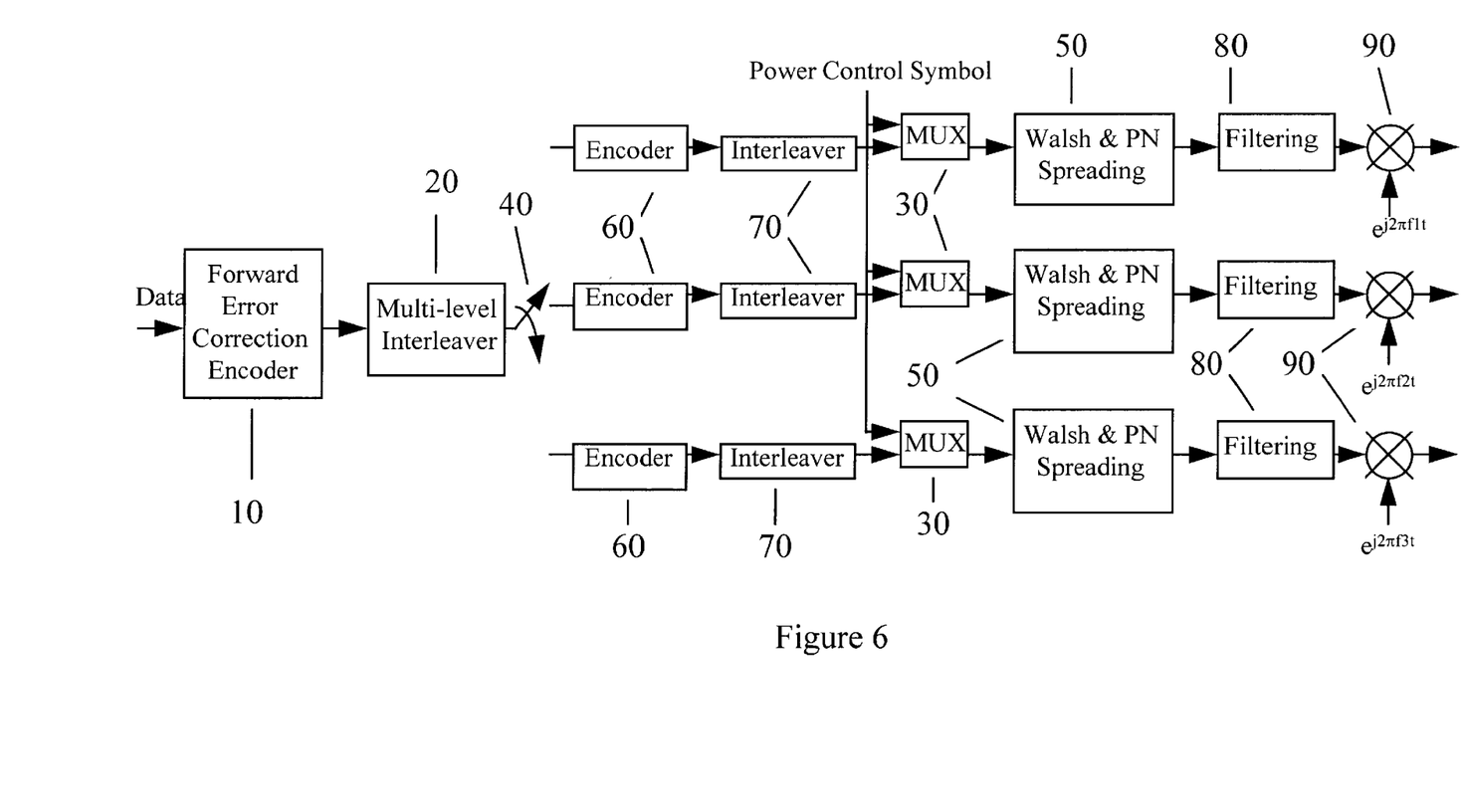
FIG. 6 depicts the invention of FIG. 3 with additional encoding and interleaving.

FIG. 6 is an illustration of an embodiment of the invention including error correction encoder 10, interleaver 20, multiplexor 30, inverse-multiplexor 40, Walsh & PN spreader 50, baseband pulse shaping filter 80 and frequency up-converter 90 in the same configuration as in FIG. 2. The embodiment illustrated in FIG. 6 differs from the embodiment in FIG. 2 in that the embodiment of FIG. 6 includes additional encoders 60 and interleavers 70 associated with the different carriers. While in the Figure the system is illustrated with an additional encoder 60 and interleaver 70 associated with each carrier, it is considered within the scope of the present invention to have only one additional encoder 60 and interleaver 70 associated with only one of the carriers or to have additional encoders 60 and interleavers 70 respectively associated with more than one but less than all of the carriers. Further, while FIG. 6 illustrates that power control symbols are multiplexed onto each carrier, it is considered within the scope of the present invention that the power control symbols may be multiplexed onto one carrier, some of the carriers or all of the carriers.

In the system illustrated in FIG. 6, the power control symbols are multiplexed onto one or more of the carriers. An advantage of this is frequency diversity and improvement in performance of the power control. This method also reduces the delay for the power control as compared with the embodiment of FIG. 5 since the power control symbols are multiplexed into the data stream after the second level of coding and interleaving.

Figure 7:
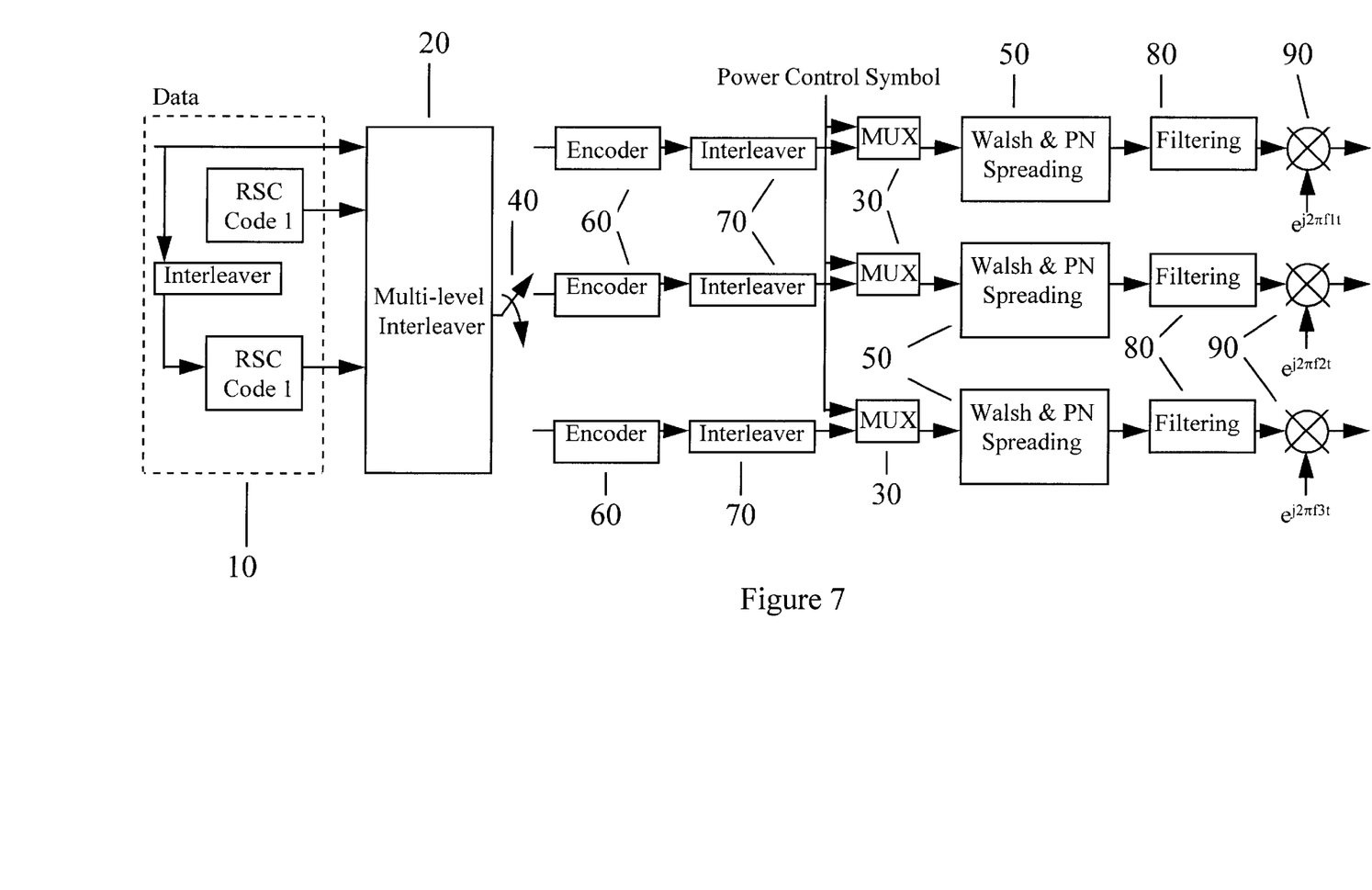
FIG. 7 depicts the invention of FIG. 3 illustrating that the encoder is a turbo encoder.

FIG. 7 is an illustration of an embodiment of the invention including error correction encoder 10, interleaver 20, multiplexor 30, inverse-multiplexor 40, Walsh & PN spreader 50, baseband pulse shaping filter 80 and frequency up-converter 90 in the same configuration as in FIG. 3. The embodiment illustrated in FIG. 7 differs from the embodiment in FIG. 3 in that the embodiment of FIG. 7 includes additional encoders 60 and interleavers 70 associated with the different carriers. As with the other embodiments discussed herein, there may be second encoders 60 and second interleavers 70 associated with 1 or more of the carriers and the power control symbols may be multiplexed onto one or more of the carriers.

In FIG. 7, the first encoder 10 is preferably a parallel concatenated convolutional encoder (also known as a turbo encoder). The first interleaver 20 is preferably a multi-level interleaver as discussed above. The turbo encoder 10 may be formed by using two or more recursive systematic convolutional (RSC) codes. The second level of encoding and interleaving is done to distribute the total complexity of the coding between the turbo codes and the second level of error correction.

It will thus be seen that the invention efficiently attains the objects set forth above, among those made apparent from the preceding description. In particular, the invention provides a system and method of channel coding and inverse-multiplexing for multi-carrier CDMA systems. Those skilled in the art will appreciate that the configurations depicted in FIGS. 1–7 make efficient use of the bandwidth and allow for backwards compatibility.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A method for transmitting a data stream in a multi-carrier CDMA system comprising:

inverse-multiplexing the data stream into a plurality of communication channels;

separately encoding each of the plurality of communication channels, wherein each code word of each of the separately encoded plurality of communication channels represents a plurality of non-sequential bits of the data stream;

separately interleaving the plurality of communication channels;

separately spreading the plurality of communication channels; and separately transmitting the plurality of communication channels on a respective plurality of carriers of the CDMA system.

2. The method for transmitting data of claim 1 further comprising:
multiplexing at least one power control symbol into the data stream.

3. The method for transmitting a data stream of claim 1 wherein:
different coding rates are applied to each of the plurality of communication channels; and
a coding rate that is applied to a particular communication channel is based upon respective channel conditions.

4. The method for transmitting a data stream of claim 1 further comprising introducing at least one power control symbol into the data stream subsequent to inverse-multiplexing the data stream; and
wherein the at least one power control symbol is only introduced into one of the plurality of channels of the data stream.

5. The method for transmitting a data stream of claim 1:
further comprising introducing at least one power control symbol into the data stream subsequent to inverse-multiplexing the data stream; and
wherein the at least one power control symbol is introduced into at least two of the plurality of channels of the data stream such that a power control symbol intended for a single wireless unit is transmitted on the at least two of the plurality of carriers of the CDMA system.

6. The method for transmitting a data stream of claim 1:
further comprising introducing at least one power control symbol into the data stream subsequent to inverse-multiplexing the data stream; and
wherein the at least one power control symbol is introduced into each of the plurality of channels of the data stream such that a power control symbol intended for a single wireless unit is transmitted on each of the plurality of carriers of the CDMA system.

7. The method for transmitting a data stream of claim 1 wherein separately encoding each of the plurality of communication employs turbo encoding.

8. The method for transmitting a data stream of claim 1 wherein a first carrier of the plurality of carriers and a second carrier of the plurality of carriers are not adjacent in frequency.

9. The method for transmitting a data stream of claim 1 wherein:
a first carrier of the plurality of carriers comprises a legacy CDMA carrier; and
a second carrier of the plurality of carriers comprises a new CDMA carrier.

10. A system for transmitting a data stream over a multi-carrier CDMA system comprising:
an inverse-multiplexor that inverse-multiplexes the data stream into a plurality of communication channels;
an encoder coupled to the inverse-multiplexor that separately encodes each of the plurality of communication channels, wherein each code word of each of the separately encoded plurality of communication channels represents a plurality of non-sequential bits of the data stream;
an interleaver coupled to the encoder that separately interleaves the plurality of communication channels;
a spreader coupled to the interleaver that separately spreads the plurality of communication channels; and a frequency up-converter coupled to the spreader that separately up-converts the plurality of communication channels to a respective plurality of carrier frequencies.

11. The system for transmitting a data stream over a multi-carrier CDMA system of claim 10 wherein:
different coding rates are applied to each of the plurality of communication channels; and
a coding rate that is applied to a particular communication channel is based upon respective channel conditions.

12. The system for transmitting a data stream over a multi-carrier CDMA system of claim 10, wherein:
at least one power control symbol is introduced into the data stream subsequent to inverse-multiplexing the data stream; and
the at least one power control symbol is only multiplexed into one of the plurality of channels of the data stream.

13. The system for transmitting a data stream over a multi-carrier CDMA system of claim 10, wherein:
at least one power control symbol is introduced into the data stream subsequent to inverse-multiplexing of the data stream; and
the at least one power control symbol is introduced into at least two of the plurality of channels of the data stream such that a power control symbol intended for a single wireless unit is transmitted on the at least two of the plurality of carriers of the CDMA system.

14. The system for transmitting a data stream over a multi-carrier CDMA system of claim 10, wherein:
at least one power control symbol is introduced into the data stream subsequent to inverse-multiplexing of the data stream; and
the at least one power control symbol is introduced into each of the plurality of channels of the data stream such that a power control symbol intended for a single wireless unit is transmitted on each of the plurality of carriers of the CDMA system.

15. The system for transmitting a data stream over a multi-carrier CDMA system of claim 10, wherein the encoder employs turbo encoding.

16. The system for transmitting a data stream over a multi-carrier CDMA system of claim 10, wherein a first carrier of the plurality of carriers and a second carrier of the plurality of carriers are not adjacent in frequency.

17. The system for transmitting a data stream over a multi-carrier CDMA system of claim 10, wherein:
a first carrier of the plurality of carriers comprises a legacy CDMA carrier; and
a second carrier of the plurality of carriers comprises a new CDMA carrier.

18. A method for transmitting a data stream in a multi-carrier CDMA system comprising:
encoding the data stream;
interleaving the data stream;
inverse-multiplexing the data stream into a plurality of communication channels;
separately spreading the plurality of communication channels;
separately transmitting the plurality of communication channels on a respective plurality of carriers of the CDMA system; and
introducing at least one power control symbol into at least two of the plurality of channels of the data stream such that a power control symbol intended for a single wireless unit is transmitted on the at least two of the plurality of carriers of the CDMA system.

19. The method for transmitting a data stream of claim 18, wherein the at least one power control symbol is introduced into each of the plurality of channels of the data stream such that a power control symbol intended for a single wireless unit is transmitted on each of the plurality of carriers of the CDMA system.

* * * * *